(12) United States Patent
Lee (10) Patent No.: US 7,188,886 B2
(45) Date of Patent: Mar. 13, 2007

(54) SHADE CURTAIN ASSEMBLY FOR CAR

(76) Inventor: Jae Woo Lee, 1037-9, Sunbu-dong, Danwon-gu, Ansan-City 425-140 (KR)

( * ) Notice: Subject to any disclaimer, the term of this patent is extended or adjusted under 35 U.S.C. 154(b) by 151 days.

(21) Appl. No.: 10/501,970

(22) PCT Filed: Apr. 7, 2004

(86) PCT No.: PCT/KR2004/000800

§ 371 (c)(1),
(2), (4) Date: Aug. 30, 2004

(87) PCT Pub. No.: WO2004/091950

PCT Pub. Date: Oct. 28, 2004

(65) Prior Publication Data

US 2006/0082184 A1    Apr. 20, 2006

(30) Foreign Application Priority Data

Apr. 17, 2003  (KR) ...................... 20-2003-0011851
Jul. 25, 2003   (KR) ...................... 20-2003-0024090

(51) Int. Cl.
*B60J 3/02* (2006.01)
(52) U.S. Cl. .................................... 296/97.8; 296/97.7

(58) Field of Classification Search ............... 296/97.7, 296/97.8; 160/370.21
See application file for complete search history.

(56) References Cited

U.S. PATENT DOCUMENTS

| | | | | |
|---|---|---|---|---|
| 4,606,572 A * | 8/1986 | Maguire | ..................... | 296/97.7 |
| 4,681,149 A * | 7/1987 | Tung-Chow | ................. | 160/134 |
| 6,981,733 B1 * | 1/2006 | Driscoll | ..................... | 296/97.6 |

FOREIGN PATENT DOCUMENTS

| | | |
|---|---|---|
| KR | 20-0280292 | 6/2002 |
| KR | 20-0299069 | 12/2002 |

* cited by examiner

Primary Examiner—Dennis H. Pedder
(74) Attorney, Agent, or Firm—Jordan and Hamburg LLP (57) ABSTRACT

Disclosed herein is a sunshield assembly for use in automotive vehicles which prevents potentially damaging solar radiation from entering the interior of the vehicle through a windshield when in motion or parking of the vehicle. The sunshield assembly comprises a mount which is fixedly installed on a windshield of the automotive vehicle, a deployable and retractable sliding unit including a plurality of connector members having the same configuration and adapted to be successively coupled to one another, and a cover configured to be coupled to an outermost one of the connector members, wing members each having a triangular steel liner narrowing toward an outer end thereof, and a coating layer attached to one surface of the steel liner, the coating layer consisting of a paper sheet, and a transparent film bonded to each other, and a holder for fixing the cover.

21 Claims, 12 Drawing Sheets

SHADE CURTAIN ASSEMBLY FOR CAR

BACKGROUND OF THE INVENTION

1. Field of the Invention

The present invention relates to a sunshield assembly for use in automotive vehicles, and more particularly to a sunshield assembly for an automotive vehicle, which prevents potentially damaging solar radiation from entering the interior of the vehicle through a windshield when in motion or parking of the vehicle, thereby eliminating a factor of obstructing a driver's view as well as preventing a rising in the temperature of the vehicle interior.

2. Description of the Related Art

The inventor of the present invention has disclosed a sliding-type sunshield in a Utility Model Registration filed in the Korean Intellectual Property Office as Serial No. 280,292. The disclosed sliding-type sunshield is adapted to partially or completely intercept solar radiation while freely adjusting a sun-shielding area.

Considering the schematic configuration of the disclosed conventional sunshield, it comprises a plurality of connector members coupled to one another. Each of the connector members is fixed at opposite sides thereof with a pair of wing members. According to vertical deployment or retraction of the coupled connector members along with the wing members, the sunshield can shield solar radiation.

The conventional sunshield, however, has a problem in that a coupling force of the coupled plural connector members is poor. Further, since the wing members incorporate synthetic resin cores, they tend to droop after extended use under a hot solar radiation environment.

SUMMARY OF THE INVENTION

Therefore, the present invention has been made in view of the above problems, and it is an object of the present invention to provide a sunshield assembly for an automotive vehicle, which enhances a coupling force between a plurality of connector members, coupled to one another, through structural alteration thereof.

It is another object of the present invention to provide a sunshield assembly for an automotive vehicle, which is designed to prevent droop of wing members when in deployment by attaching steel liners inside the wing members, respectively, for reinforcing a tensile strength thereof, thereby being capable of increasing a sun-shielding effect.

It is yet another object of the present invention to provide a sunshield assembly for an automotive vehicle, which is designed to allow an advertisement printed on paper sheets, attached to steel liners of plural wing members, to be clearly displayed to the outside while preventing deformation thereof even after extended use through the use of transparent films externally coated to the advertisement printed paper sheets.

In accordance with the present invention, the above and other objects can be accomplished by the provision of a sunshield assembly for an automotive vehicle comprising: a mount which is fixedly installed on a windshield of the automotive vehicle; a deployable and retractable sliding unit including a plurality of connector members having the same configuration and adapted to be successively coupled to one another, and a cover configured to be coupled to an outermost one of the connector members; wing members each having a triangular steel liner narrowing toward an outer end thereof, and a coating layer attached to one surface of the steel liner, the coating layer consisting of a paper sheet, and a transparent film bonded to each other; a holder for fixing the cover; and a locking clip fixed to a lower surface of the mount.

Preferably, the mount may include an attachment plate having a double-sided tape attached to one surface thereof facing the windshield of the automotive vehicle, a male-gear portion centrally formed at the other surface thereof and having an angle adjustment function, and screw holes arranged at the outside of the male-gear portion, and a fixing plate having a female-gear portion formed at one surface thereof so as to be engaged with the male-gear portion, two raised guidance portions and two protrusions protruding outwardly from the other surface thereof and extending vertically, and a permanent magnet and bolt holes formed inwardly of the raised guidance portions.

Preferably, each of the connector members may have a support, and a pair of wing member fixtures formed at opposite sides of the support, the wing member fixtures being bent toward the windshield by an angle of 10° to 15°.

Preferably, the support may includes a pair of raised guidance portions extending vertically at one surface thereof while maintaining a constant distance therebeween, a stopper formed near an upper end thereof, and two protrusions extending vertically from a lower end thereof, which are located inwardly of the raised guidance portions, a pair of recessed guidance portions and a pair of guiding grooves defined in the other surface thereof while maintaining constant distances therebetween, respectively, into which the raised guidance portions and protrusions formed at an inwardly positioned one of the connector members are inserted, and a stepped portion and an embedded permanent magnet provided in an upper portion of the other surface thereof.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

As shown in the accompanying drawings illustrating the general configuration of a sunshield assembly for an automotive vehicle in accordance with the present invention, the sunshield assembly comprises a mount 5 which is fixed on a windshield of the automotive vehicle and has a mounting-angle adjustment function, and a sliding unit 10 which is coupled to the mount 5. The sliding unit 10 includes a plurality of connector members 8 and 8a, and a cover 9. The sunshield assembly further comprises a plurality of wing members 15 each being coupled to one side of the respective connector members 8 and 8a, a holder 20 for use in the fixation of the cover 9, and a locking clip 25 adapted to prevent the downward movement of the sliding unit 10.

Figure 1:
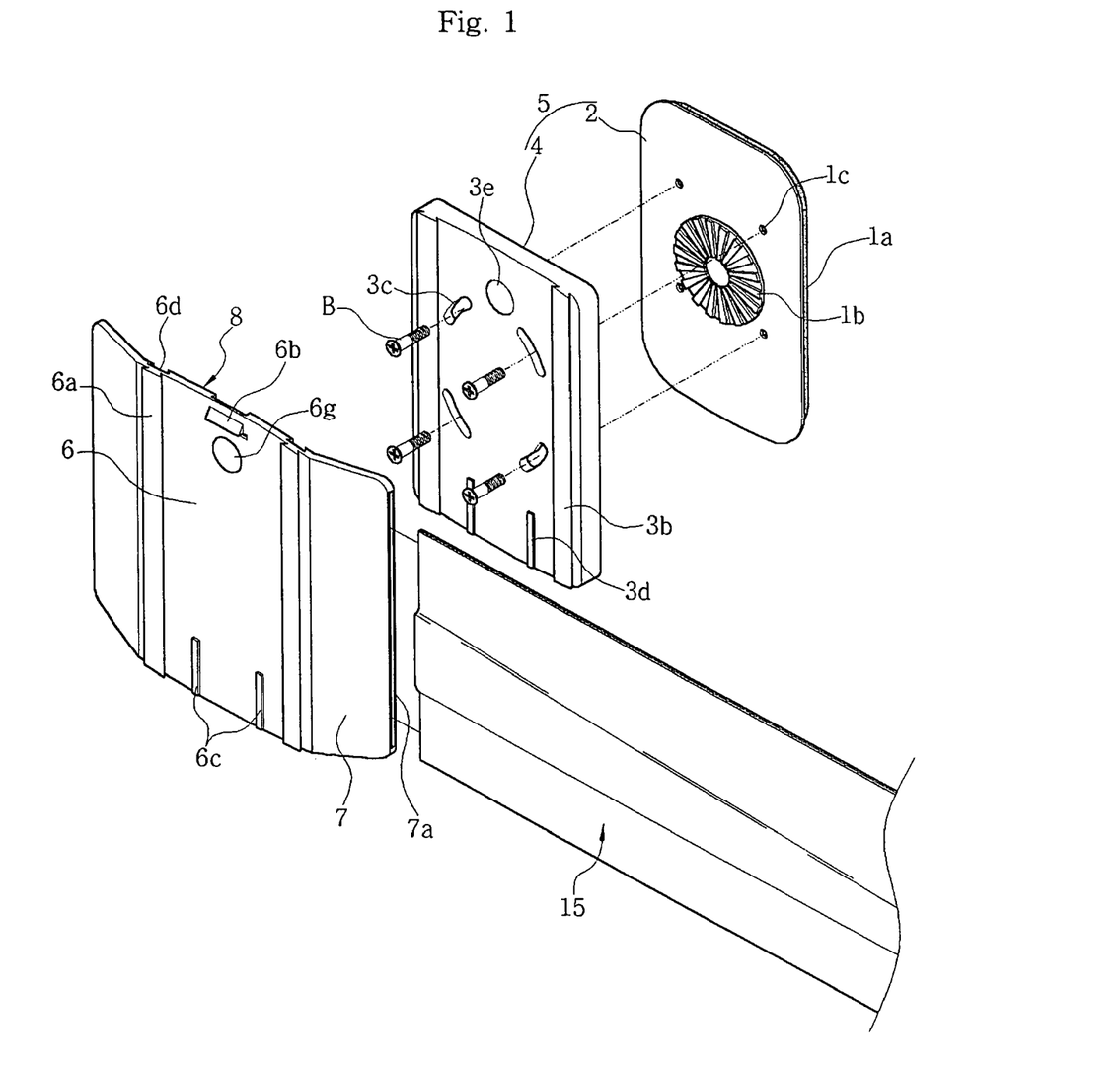
FIG. 1 is an exploded perspective view illustrating the general configuration of a sunshield assembly in accordance with the present invention.
Figure 2:
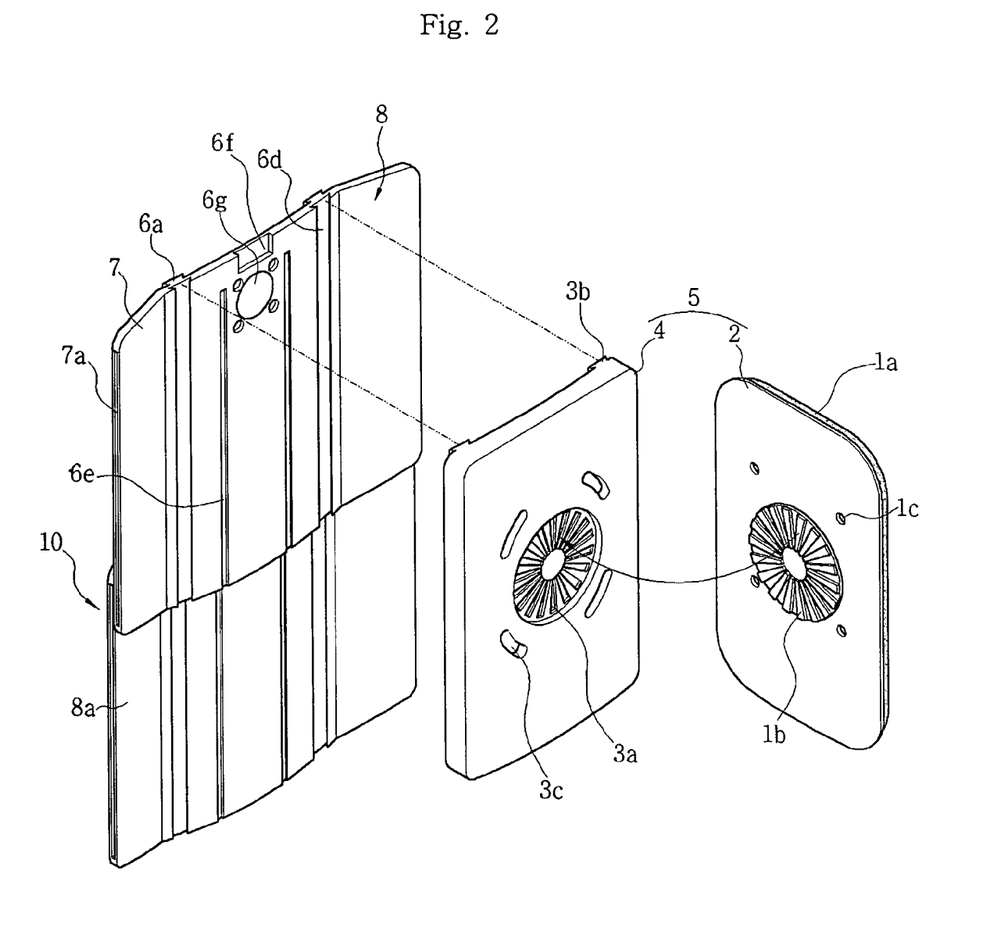
FIG. 2 is an exploded perspective view illustrating a mount of the sunshield assembly in accordance with the present invention.

Referring first to FIGS. 1 and 2, the mount 5 includes an attachment plate 2 which is fixed to the windshield of the automotive vehicle, and a fixing plate 4 which is coupled to an innermost one of the connector members 8.

To a rear surface of the attachment plate 2, facing the windshield of the automotive vehicle, is attached a double-sided tape 1a for fixing the sunshield assembly to a desired installation region of the windshield. Further, from a front surface of the attachment plate 2 protrudes outwardly a center male-gear portion 1b, and screw holes 1c are arranged at the outside of the center male-gear portion 1b. The male-gear portion 1b serves to adjust a mounting angle of the attachment plate 2.

The fixing plate 4, which is coupled at one side with the attachment plate 2, and is coupled at the other side with the connector member 8, is formed with a center female-gear portion 3a at a rear surface thereof facing the attachment plate 2. The center female-gear portion 3a is adapted to be engaged with the center male-gear portion 1b of the attachment plate 2. From a front surface of the fixing plate 4 protrudes outwardly two raised guidance portions 3b extending vertically, and bolt holes 3c are arranged inwardly of the raised guidance portions 3b for the screwing of bolts (B).

In addition, the front surface of the fixing plate 4 is provided with a pair of protrusions 3d vertically extending from a lower end thereof, and a permanent magnet 3e embedded in an upper portion thereof and adapted to prevent unintentional separation of the innermost connector member 8 coupled to the fixing plate 4.

Figure 3:
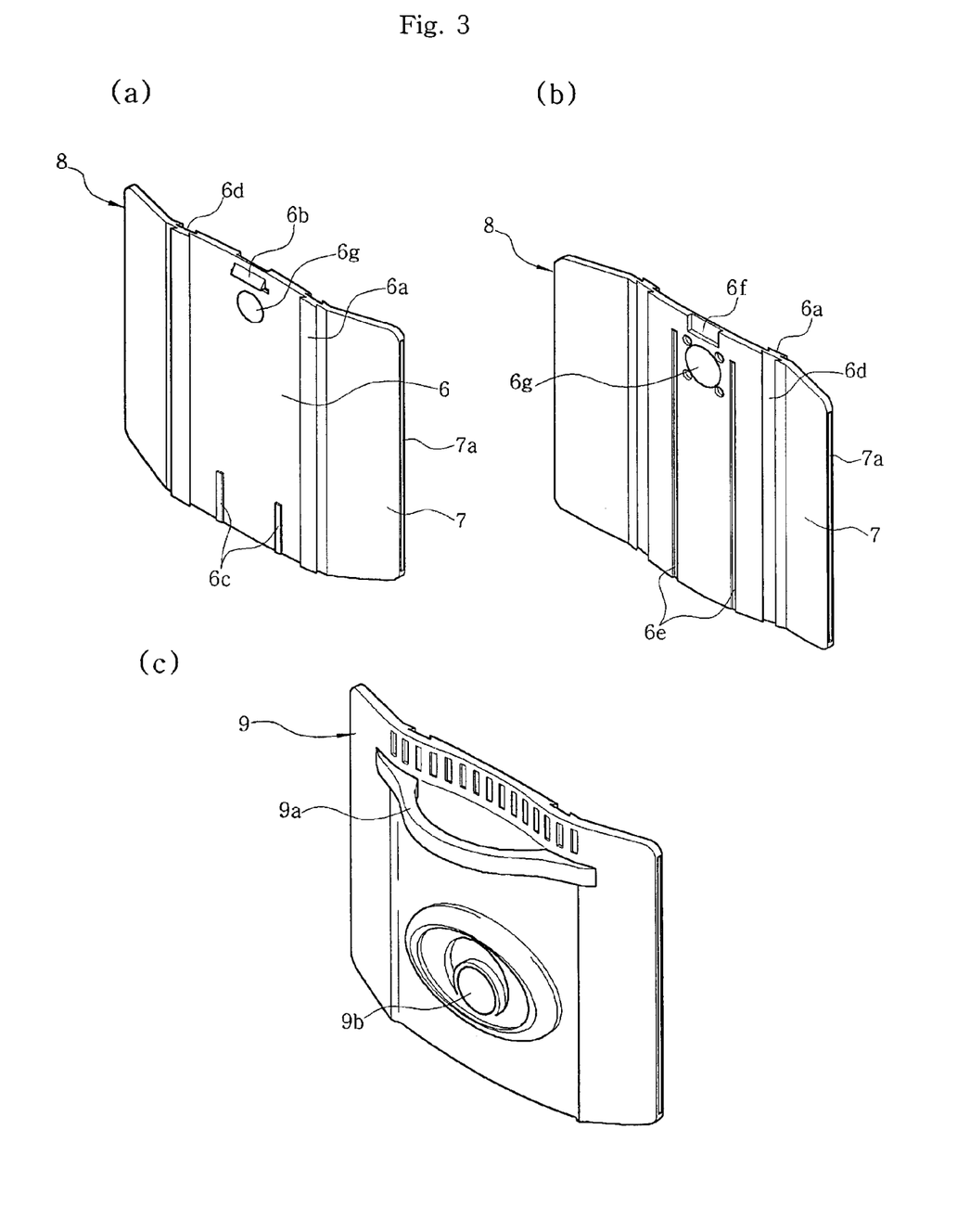
FIGS. 3a to 3c are perspective views illustrating a connector member and a cover of the sunshield assembly in accordance with the present invention, FIG. 3a illustrating a front surface of the connector member, FIG. 3b illustrating a rear surface of the connector member, and FIG. 3c illustrating a front surface of the cover.
Figure 4:
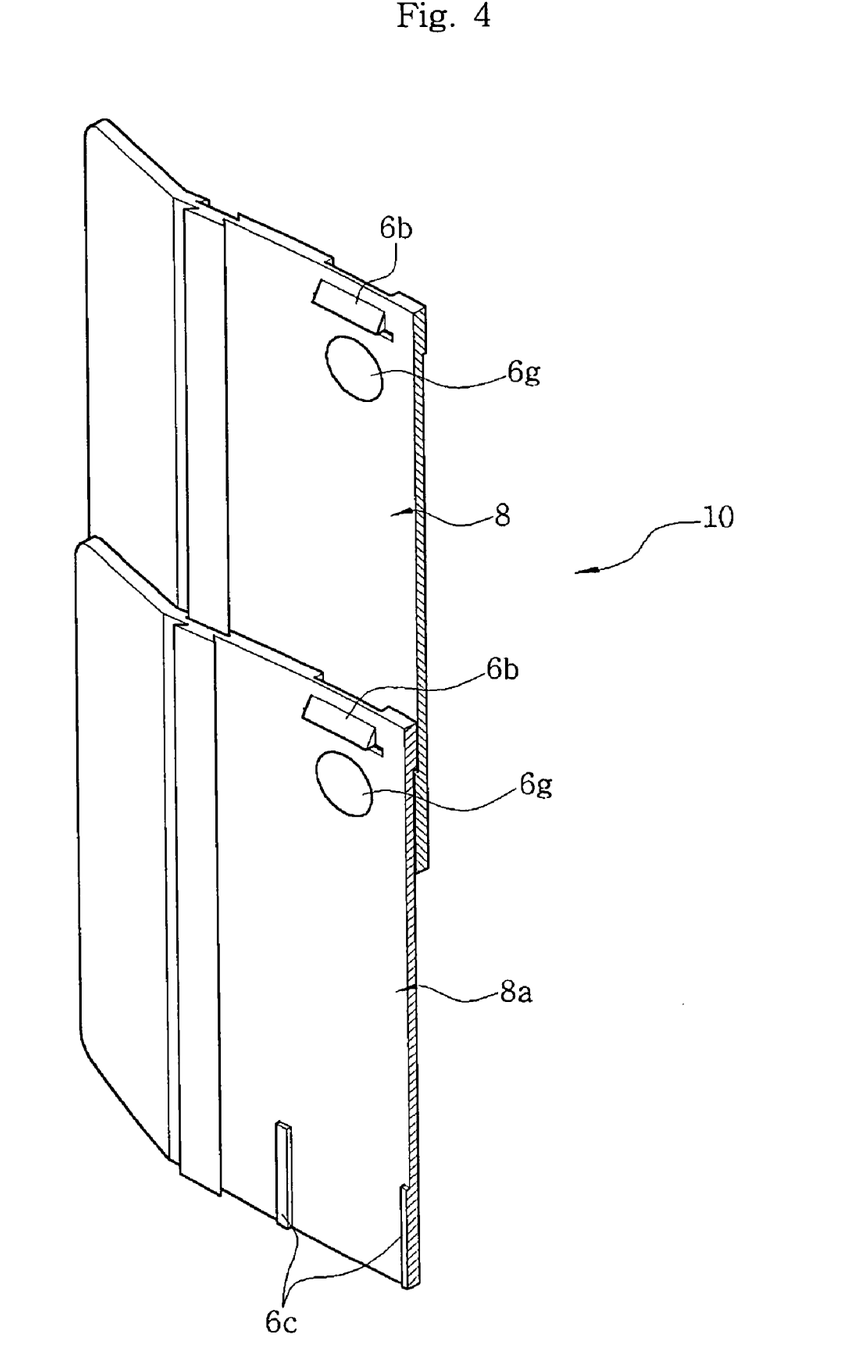
FIG. 4 is a partially cut-away perspective view illustrating a coupled state of two connector members.

Referring to FIGS. 3a to 4, the sliding unit 10, which is integrally coupled to the fixing plate 4, as stated above, includes a plurality of the connector members 8 and 8a, and the single cover 9 coupled to an outermost one of the connector members 8a. The plurality of the connector members 8 and 8a have the same configuration, and are freely adjustable in a sun-shielding area according to their vertical deployment and retraction operations.

Each of the connector members 8 and 8a, made of high-durability and heat-resistance injection-molded synthetic resins, has a center support 6, and a pair of wing member fixtures 7 formed at opposite sides of the support 6. The wing member fixtures 7 are concavely bent toward the fixing plate 4 by an angle of 10° to 15°.

The support 6 has two raised guidance portions 6a, which protrude outwardly from a front surface of the support 6 and extend vertically while maintaining a constant distance therebetween. The support 6 further has a stopper 6b formed near an upper end thereof, and two lower protrusions 6c extending vertically from a lower end thereof, which are located inwardly of the raised guidance portions 6a.

At a rear surface of the support 6 are formed a pair of recessed guidance portions 6d and a pair of guiding grooves 6e, which are spaced apart from one another by constant distances for the fitting of the raised guidance portions 6a and protrusions 6c of an inwardly positioned one of the connector members or the raised guidance portions 3b and protrusions 3d of the fixing plate 4.

The support 6 further has a stepped portion 6f, which is configured and positioned so as to be caught by the stopper 6b formed at an associated one of the connector members.

In addition, a permanent magnet 6g is embedded in an upper center position of the support 6 by using an insert injection molding technique. The permanent magnet 6g has a strong magnetic force causing it to be separated only when an artificial external force is applied thereto. Thanks to such a permanent magnet 6g, therefore, the respective connector members 8 and 8a are strongly adhered to one another, so as to prevent the downward movement of the connector members 8 and 8a during retraction operation thereof.

With relation to such a retraction operation of the connector members 8 and 8a, further, in order to prevent the retracted and overlapped connector members from deteriorating in appearance and obstructing a driver's view, the connector members 8 and 8a should be configured to maintain a generally gentle curvature while securing a relatively wide driver's view in their completely or partially retracted state. For this, the connector members 8 and 8a are configured as follows.

Figure 5:
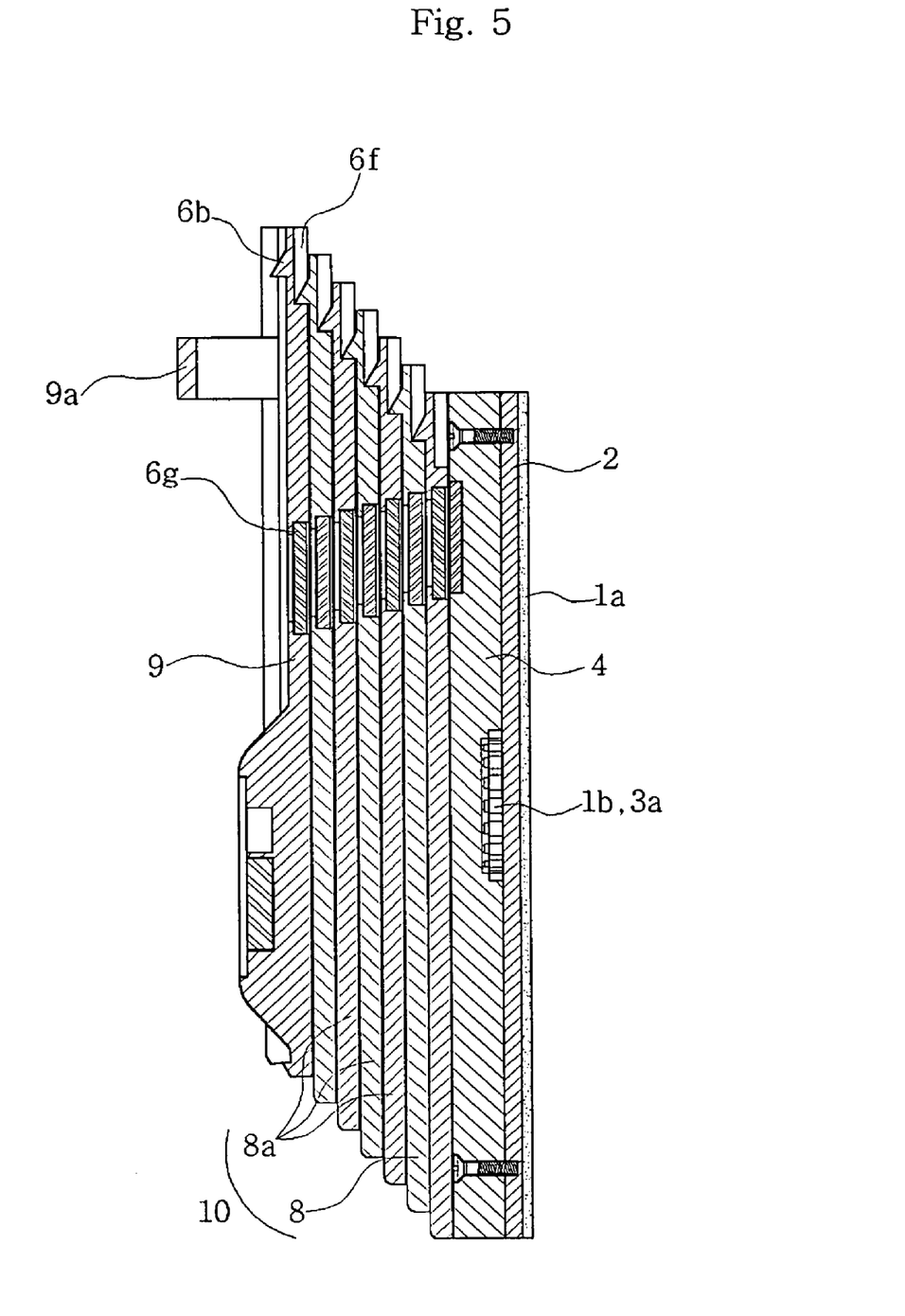
FIG. 5 is a longitudinal sectional view illustrating a coupled state of a plurality of connector members.

Referring to FIG. 5, if the stepped portion 6f of the respective connector members 8 and 8a is lowered below the stopper 6b thereof by a height of 2 mm, in a retracted state, the respective outwardly positioned connector members 8a are raised relative to the respective associated inwardly positioned connector members 8 and 8a by a height of approximately 2 mm so as to define a stepped stacking structure while maintaining a gentle curvature.

In such a stepped stacking structure, the permanent magnets 6g embedded in the coupled connector members 8 and 8a are successively lowered relative to one another by constant distances of 0.5 mm.

As the permanent magnets 6g are obliquely adhered to one another by constant distances of 0.5 mm, a magnetic force caused by each two permanent magnets 6g, adhered to each other, acts to allow the outwardly positioned connector members to be pulled upwardly relative to the inwardly positioned connector members, respectively.

During the upward movement of the outwardly positioned connector members, as the stepped portions 6f formed at the rear surfaces of the outwardly positioned connector members are caught by the stoppers 6b formed at the front surfaces of the inwardly positioned connector members so as not to move any longer, each two permanent magnets 6g are obliquely adhered to each other by the constant distances of 0.5 mm. Such an arrangement, consequently, enables easy deployment of the outwardly positioned connector, members.

In an embodiment of the present invention, there are prepared approximately thirteen connector members in a set. In this case, in order to secure easy and convenient deployment of these connector members 8 and 8a, it is preferable that the inwardly positioned six connector members are embedded with three permanent magnets 6g, respectively, the middle connector member is embedded with four permanent magnets 6g, and again the outwardly positioned six connector members are embedded with three permanent magnets 6g. By differentiating the number of the permanent magnets 6g as stated above, the vertical deployment and retraction operations of the connector members 8 and 8a can be more smoothly achieved.

As can be seen from the above description, the connector members 8 and 8a are adapted to be successively deployed one by one.

In addition, by differentiating dimensions of the permanent magnets 6g embedded in some of the connector members, or gradually weakening the intensity of their magnetic force toward the outside, the connector members 8 and 8a are adapted to be smoothly slid relative to one another.

The wing member fixtures 7, integrally extended from the opposite sides of the support 6 of the respective connector members 8 and 8a, are concavely bent toward the fixing plate 4 by an angle of 0° to 15°, and are formed at opposite edges thereof with insertion grooves 7a having a length of approximately 2 cm.

Figure 8:
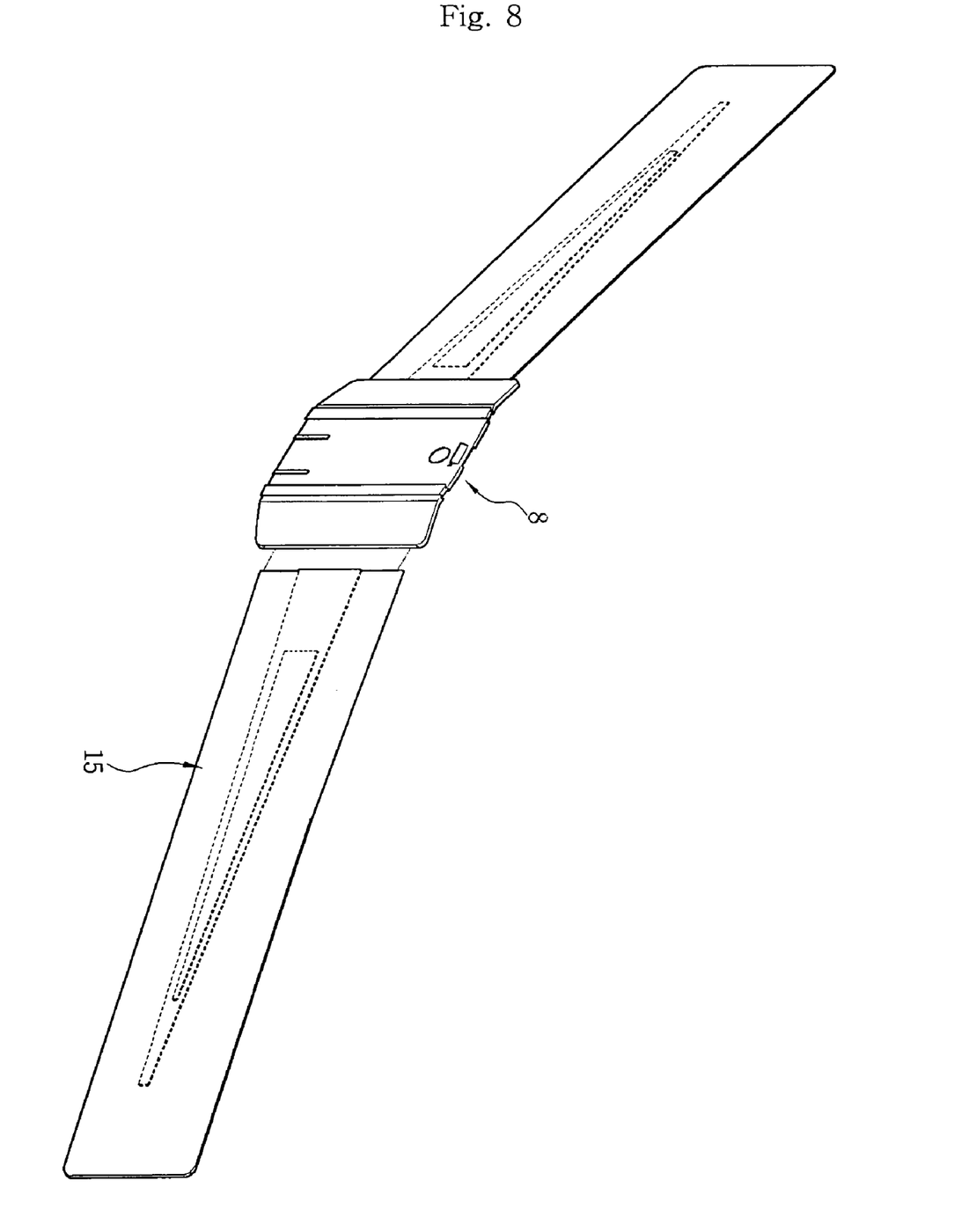
FIG. 8 is a perspective view illustrating a state wherein a pair of the wing members are coupled to opposite sides of the connector member.

Into the insertion grooves 7a are inserted inner ends of the wing members 15, and then the inserted inner ends of the wing members 15 are affixed through high frequency bonding.

Referring again to FIG. 4 illustrating a coupled state of two connector members 8 and 8a, they are coupled to each another as the raised guidance portions 6a and protrusions 6c formed at the front surface of the support 6 of the connector member 8 are coincided with and fitted into the recessed guidance portions 6d and guiding grooves 6e formed at the rear surface of the support 6 of the connector member 8a.

During the deployment operation of the coupled connector members 8 and 8a, upper ends of the guiding grooves 6e are caught by the protrusions 6c, whereas during the retraction operation thereof, the stepped portions 6f are caught by the outwardly protruding stoppers 6b.

Therefore, the respective connector members 8 and 8a are deployable or retractable vertically within a predetermined range between the stoppers 6b of the upwardly positioned respective connector members and the protrusions 6c of the downwardly positioned respective connector members.

Since, the raised guidance portions 6a and protrusions 6c formed at the front surfaces of the connector members are fitted in the recessed guidance portions 6d and guiding grooves 6e formed at the rear surfaces of the other connector members, the coupled connector members 8 and 8a can be maintained without causing unintentional separation or lateral biasing thereof.

Referring to FIG. 3c again, the cover 9, which is coupled to an outermost one of the coupled connector members 8 and 8a, is configured as follows.

The cover 9 has a handle 9a formed at a front surface thereof for the insertion of a finger, and a permanent magnet 9b embedded in a lower portion thereof for ease of coupling the holder 20.

Figure 6:
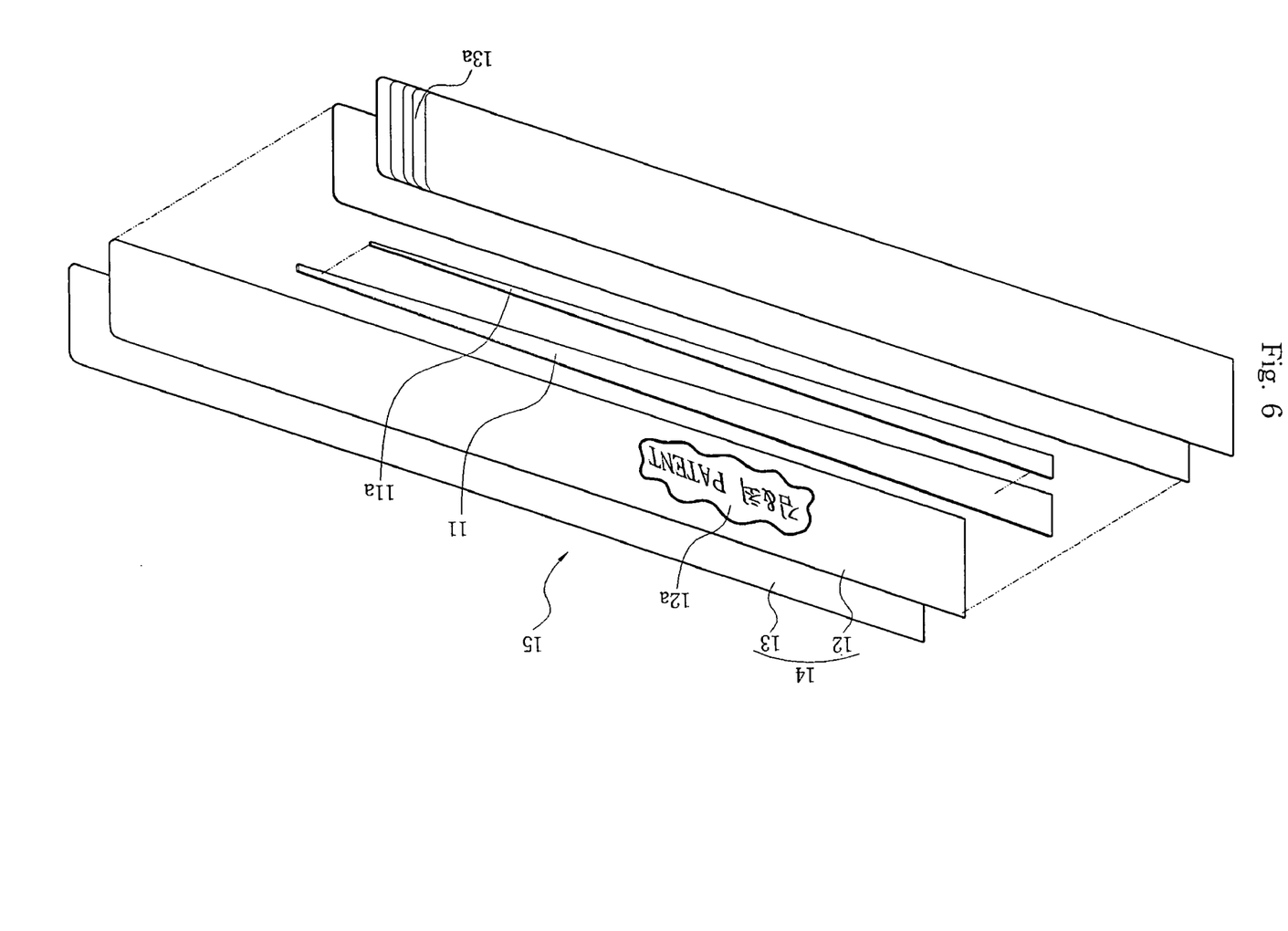
FIG. 6 is an exploded perspective view illustrating a wing member of the sunshield assembly in accordance with the present invention.

Referring to FIG. 6, each of the wing members 15, which is fixedly inserted at its inner end into the insertion groove 7a of the wing member fixture 7, has a steel liner 11 attached to a rear surface thereof, and a coating layer 4 attached to a rear surface of the steel liner 11 facing the windshield of the automotive vehicle.

The steel liner 14 is an elastic liner having a good tensile force and restoring force, and has an approximately triangular shape narrowing toward an outer end of the wing member 15.

By virtue of such a configuration, the tension of the wing member 15 is sufficiently increased to prevent the drooping thereof.

The single steel liner 11 is sufficient in case that the windshield of the automotive vehicle is narrow in width, but in case of a wide windshield, an auxiliary steel liner 11a, as a miniature of the steel liner 11, may be added to increase the tensile force of the wing member 15.

The coating layer 14, which is integrally attached to the rear surfaces of the steel liners 11 and 11a, is divided into a paper sheet 12 and a transparent film 13.

The paper sheet 12 is printed with an advertisement 12a including figures and letters, thereby endowing the sunshield assembly of the present invention with an advertising effect in a deployed state thereof.

Here, the contents of the advertisement 12a can be variously altered in compliance with an order of clients.

The transparent film 13 is formed from polyester resins, and serves to allow the advertisement 12a printed on the paper sheet 12 to be clearly displayed to the outside, and prevents the deposition of various impurities on the advertisement 12a.

The transparent film 13 is formed at an end region thereof with equally spaced cutting lines 13a for allowing the transparent film 13 to be cut to conform to the width of the windshield.

The wing member 15 is generally narrowed so that an inner portion thereof is wider than an outer portion thereof. Such a configuration enables a plurality of the wing members 15 to be smoothly slid relative to one another, thereby securing ease in retraction thereof, and further increases elasticity thereof, resulting in an enhancement in a sun-shielding effect.

Figure 7:
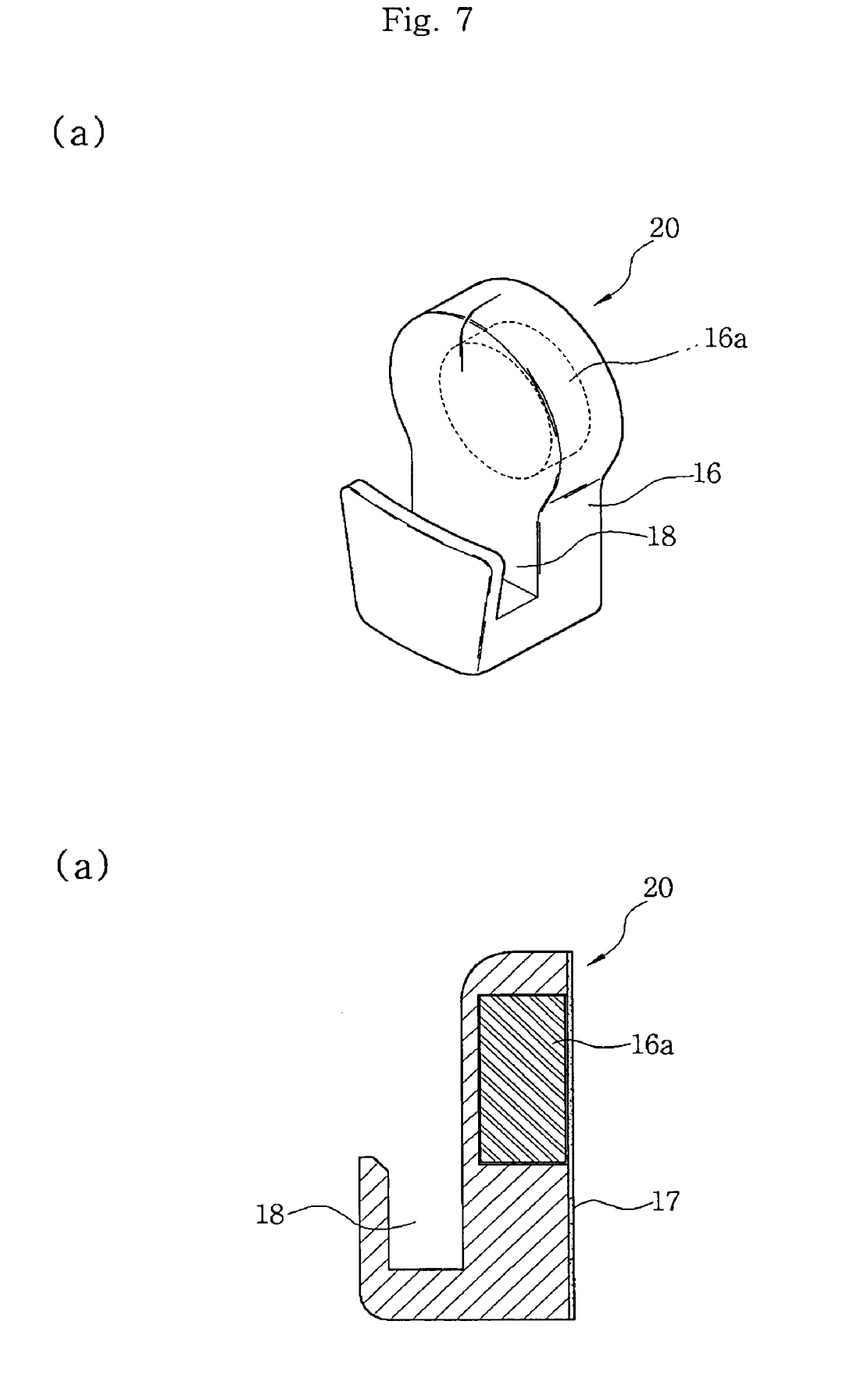
FIGS. 7a and 7b are a perspective view and a longitudinal sectional view, respectively, illustrating a holder of the sunshield assembly in accordance with the present invention.

Referring to FIGS. 7a and 7b, the holder 20, which is used for stably fixing the completely deployed connector members 8 and 8a to the windshield of the automotive vehicle, includes an attachment plate 16 which incorporates a permanent magnet 16a therein, and is attached with a double-sided tape 17 at a rear surface thereof facing the windshield. In front of the attachment plate 16 is defined a seating recess 18, into which the cover 9 is fitted.

Figure 9:
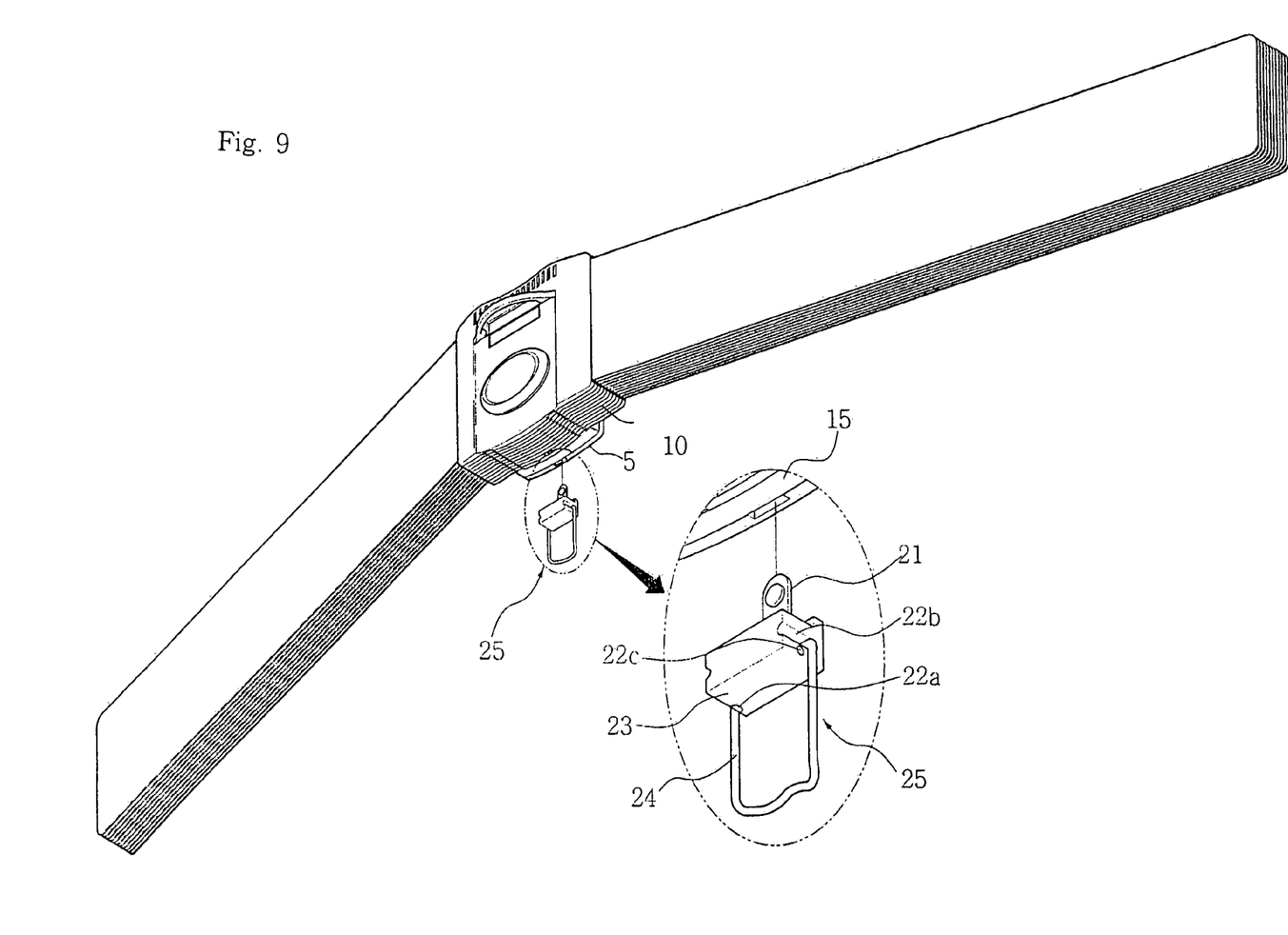
FIG. 9 is an exploded perspective view illustrating a locking clip to be coupled to the sunshield assembly in accordance with the present invention.
Figure 10:
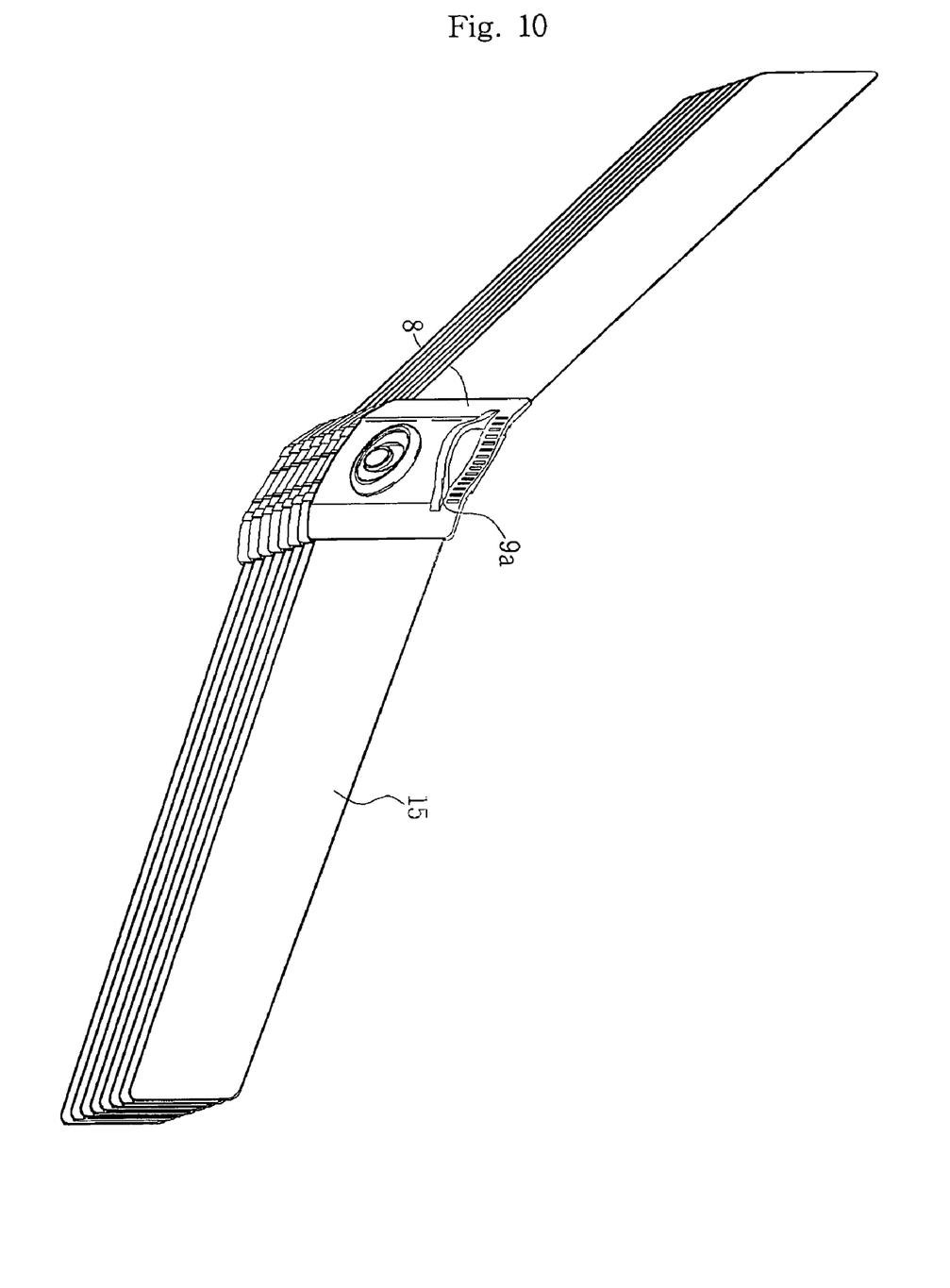
FIG. 10 is a perspective view illustrating a retracted state of the sunshield assembly in accordance with the present invention.

Referring to FIG. 9, the locking clip 25 is fastened to a lower end of the mount 5, and adapted to prevent the downward movement of the sliding unit 10. The locking clip 25 includes a clamp 23, and a retainer 24.

From the center of an upper surface of the clamp 23 protrudes upwardly a fastener 21, which is fastened to the mount 5. In addition, at both side surfaces of the clamp 23 are formed longitudinal and transversal grooves 22a and 22b.

Inside the longitudinal and transversal grooves 22a and 22b are formed bosses 22c for preventing movement of the retainer 24, respectively.

The retainer 24 is coupled to the side surfaces of the clamp 23 so that it is fitted in the longitudinal grooves 22a or transversal grooves 22b.

That is, when the connector members 8 and 8a are completely retracted and the locking clip 25 is fastened to the mount 5, the retainer 24 is fitted in the transversal grooves 22b and is adapted to carry lower surfaces of the connector members 8 and 8a, whereas, in case of deployment of the connector members 8 and 8a, it is fitted in the longitudinal grooves 22a.

Now, the operation of the sunshield assembly in accordance with the present invention configured as stated above will be explained.

Figure 12:
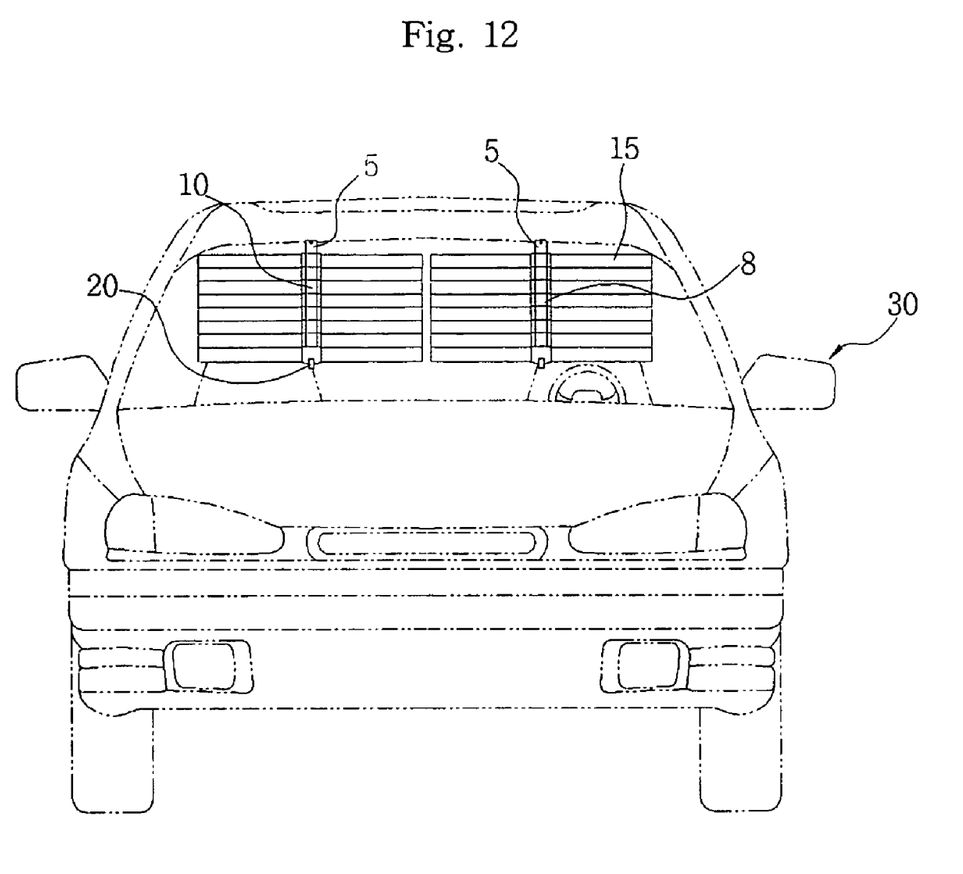
FIG. 12 is a front view illustrating the sunshield assembly mounted to an automotive vehicle in accordance with the present invention.

For the installation thereof, first, the attachment plate 2 is fixed at the rear surface thereof on the windshield of an automotive vehicle 30 by using the double-sided tape 1a thereof, and the fixing plate 4 is fastened to the front surface of the attachment plate 2.

In this case, through the interaction of the male-gear portion 1b formed at the front surface of the attachment plate 2 and the female-gear portion 3a formed at the rear surface of the fixing plate 4, the fixing plate 4 is accurately adjusted in its horizontal and vertical positions, and then is firmly fixed to the attachment plate 2 as the bolts (B) are screwed through the bolt holes 3c.

Figure 11:
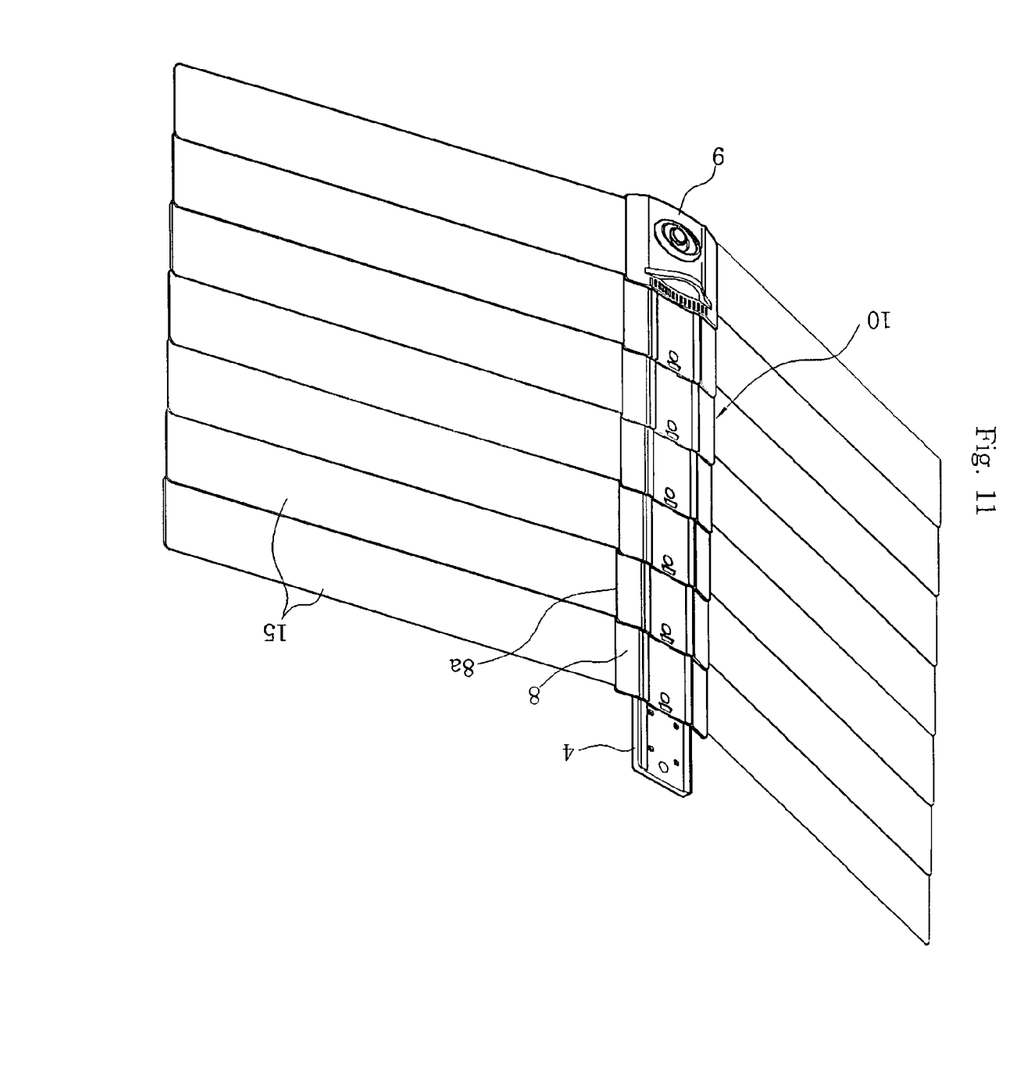
FIG. 11 is a perspective view illustrating a deployed state of the sunshield assembly in accordance with the present invention.

After the fixing plate 4 is fixed relative to the automotive vehicle in this way, the combination of the connector members 8 and 8a and the wing members 15 is coupled to the fixing plate 4. Here, as stated above, to the respective wing members 15 are attached the successively overlapped steel liner 11a and auxiliary steel liner 11a, and in turn, to the rear surfaces of both the liners 11 and 11a are successively attached the paper sheet 12, printed with the advertisement 12a, and the transparent film 13. Here, the connector members 8 and 8a, coupled with the wing members 15, as shown in FIG. 11, are curved vertically, and this is effective to secure a wide driver's view and considerably reduce any unpleasant feeling due to the installation thereof.

The respective connector members 8 and 8a are integrally coupled with one another, as the raised guidance portions 6a and protrusions 6c formed at the front surfaces of the inwardly positioned connector members are fitted in the recessed portions 6d and guiding grooves 6e formed at the rear surfaces of the outwardly positioned connector members.

In a coupled state of a plurality of the connector members 8 and 8a, their deployment and retraction operations are limited within a predetermined range by the stoppers 6b and the stepped portions 6f.

In a fixed state to the fixing plate 4, these successively retracted connector members 8 and 8a are deployable as shown in FIG. 12, so as to effectively prevent solar radiation from entering the interior of the vehicle through the windshield.

When in motion, in order to secure a required driver's view, only the two or three connector members 8 and 8a are deployed downwardly so as to partially shield the windshield of the automotive vehicle.

On the other hand, during parking, all of the connector members 8 and 8a are deployed, and the cover 9 is fitted in the seating recess 18 formed in the holder 20, so as to completely shield the windshield of the automotive vehicle. In this way, in a deployed state, the sunshield assembly of the present invention can shield solar radiation and prevent rising the interior temperature of the vehicle, and also can achieve an advertisement effect using the advertisement 12a printed on the wing members 15.

As apparent from the above description, the present invention provides a sunshield assembly for an automotive vehicle, which is designed to cover an interior surface of a windshield of the vehicle through smooth deployment and retraction operations of a plurality of connector members thereof across the windshield while freely adjusting a sunshielding area thereof.

Further, according to the present invention, the sunshield assembly, having a horizontally elongated shape, can be continuously maintained in a stable and uniform state without causing any deformation or drooping thereof even under a hot solar radiation environment.

Furthermore, according to the present invention, from an advertisement, printed on paper sheets externally attached to the sunshield assembly so as to be clearly displayed to the outside, it is possible to maximize an advertising effect using the sunshield assembly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sunshield assembly for a vehicle comprising:
   a mount member for mounting the sunshield assembly on a windshield of the vehicle:
   a deployable and retractable sliding unit having a plurality of connector members, wherein the connector members are slidably coupled to each other and an outermost connector member is slidably coupled to the mount member; and
   wing members, at least one wing member of said wing members coupled to each connector member and having a coating layer and an elastic member against the windshield when the sunshield assembly is mounted on
   wherein the elastic member has a width which is narrowed toward an outer end of the wing member.

2. The sunshield assembly as recited in claim 1, wherein the elastic member includes a triangle shaped steel liner.

3. The sunshield assembly as recited in claim 1, wherein said at least one wing member is a pair of wing members coupled respectively to opposite sides of said connector members.

4. The sunshield assembly as recited in claim 3, wherein the connector members respectively include a support member and a pair of wing member fixtures formed at opposite sides of the support member, wherein each of said wing member fixtures is bent at a predetermined angle.

5. The sunshield assembly as recited in claim 4 wherein said support members respectively include:
   at least one raised guidance portion formed at one surface of the support member; and
   at least one recessed guidance portion formed at another surface of the support member for slidably filling at a raised guidance portion of said raised guidance portions formed at an adjacent one of the support members.

6. The sunshield assembly as recited in claim 5, wherein said support members respectively further include:
   an upper stopper member, and
   a lower stopper member,
   wherein the upper and lower stopper member slidably extend vertically while maintaining a constant distance between the upper stopper member and the lower stopper member.

7. The sunshield assembly as recited in claim 6, wherein the upper stopper member includes:
   a stopper member formed at an upper end of one surface of a respective one of the support members; and a stepped portion for fitting a stopper formed at another one of the support members.

8. The sunshield assembly recited in claim 7, wherein the lower stopper member includes:
at least one lower protrusion extending vertically from a lower end of the one surface of the support member; and
at least One guiding groove formed at the other surface of the support member for fitting the lower protrusion of another one of the support members.

9. The sunshield assembly as recited in claim 5, wherein said support members respectively further include at least one permanent magnet embedded in an upper position of the support member to adhere one of the support members to another one of the support members so as to prevent a downward movement of the connector member during retraction operation of the sunshield assembly.

10. The sunshield assembly as recited in claim 1, wherein the mount member includes:
an attachment plate detachably attached to the windshield of the vehicle; and
a fixing plate having one side rotatably coupled to the attachment plate and another side slidably coupled to an outermost connector member of said connector members.

11. The sunshield assembly as recited in claim 10, wherein the attachment plate includes a male-gear portion and the fixing plate includes a female-gear portion engaged with the male-gear portion, wherein the male-gear portion is rotatably coupled to the female-gear portion.

12. The sunshield assembly as recited in claim 11, wherein a rear surface of the attachment plate mounts a double-sided tape for fixing the sunshield assembly to a desired installation region of the windshield.

13. The sunshield assembly as recited in claim 10, wherein the fixing plate includes:
a guidance portion protruding outwardly from the fixing plate and slidably guiding the outermost connector member; and
at least one permanent magnet embedded in the guidance portion and adapted to prevent a downward movement of the connector members during retraction operation of the sunshield assembly.

14. The sunshield assembly as recited in claim 2, wherein the elastic member further includes an auxiliary steel liner attached to the steel liner so as to increase a tensile force of the wing members, the auxiliary steel liner having a same shape as the steel liner.

15. The sunshield assembly as recited in claim 14, wherein the coating layer is attached to the rear surface of the steel liner.

16. The sunshield assembly as recited in claim 15, wherein the coating layer has a paper sheet and a transparent film bonded to each other, wherein the paper sheet is printed with an advertisement including a picture and letters.

17. The sunshield assembly as recited in claim 16, wherein the transparent film has cutting lines formed at an outer end portion thereof for allowing the transparent film to be cut to conform to a width of the windshield of the vehicle.

18. The sunshield assembly as recited in claim 4, further comprising a cover coupled to an outermost connector member of the connector members, wherein the cover includes:
a handle protruding outwardly from one surface thereof for insertion of a finger; and
a permanent magnet embedded below the handle.

19. The sunshield assembly recited in claim 18, further comprising:
a holder for fixing the cover; and
a locking clip fixed to a lower surface of the mount.

20. The sunshield assembly as recited in claim 19, wherein the holder includes:
an attachment plate having a permanent magnet embedded therein, and
a double-sided tape attached at one surface thereof facing the windshield and a seating recess defined in front of the attachment plate for fitting of the cover.

21. The sunshield assembly as recited in claim 19 wherein the locking clip includes:
a clamp having longitudinal and transversal grooves and a fastener upwardly protruding from a center position of an upper surface thereof; and
a retainer configured to be coupled to opposite side surfaces of the clamp and selectively fitted in one the longitudinal grooves or the transversal grooves according to forward or rearward movement thereof.

* * * * *